May 15, 1951     C. F. NELSON     2,552,997
ROACH TRAP
Filed Dec. 19, 1945
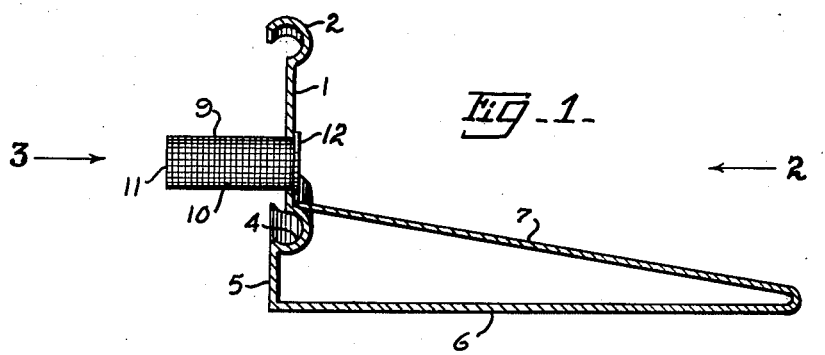
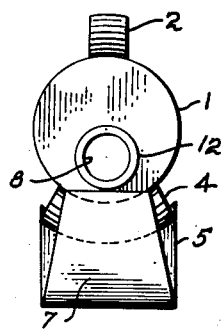 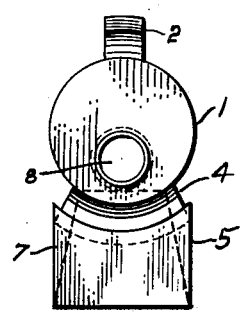
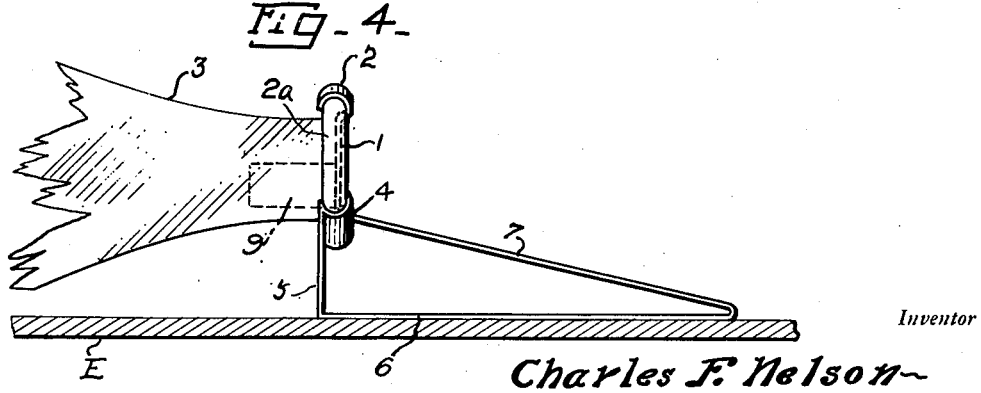
Inventor
Charles F. Nelson
By Clarence A. O'Brien
and Harvey B. Jacobson
Attorneys Patented May 15, 1951

2,552,997

UNITED STATES PATENT OFFICE 2,552,997

ROACH TRAP

Charles F. Nelson, Tuscaloosa, Ala.

Application December 19, 1945, Serial No. 635,911

2 Claims. (Cl. 43—121)

My invention relates to improvements in roach traps and the principal object of the invention is to provide a device of the character herewithin described which is applicable to milk bottles and the like, of any standard design.

A further object of the invention is to provide a roach trap which may be used to contain suitable bait.

A further object of the invention is to provide a roach trap which is especially adapted to capture the insects alive, in order that they may be used by fishermen, or otherwise similarly disposed of.

A further object of the invention is to provide a roach trap of a design suitable for easy access of insects to be captured.

With the above more important objects in view, and such other objects as may become apparent as this specification proceeds, my invention consists essentially of the arrangement and construction of parts as illustrated in the accompanying drawings, in which:

In the accompanying drawings—

Figure 1 is a side elevation partially sectioned showing my invention.

Figure 2 is a front view taken along the direction of the arrow 2 in Figure 1.

Figure 3 is a rear view taken along the direction of the arrow 3 in Figure 1, and Figure 4 shows in side view my invention as applied to a standard milk bottle.

Referring to the drawings in detail, my invention consists of a flat circular plate 1 provided at the top thereof with a radially projecting upper resilient clamp 2 curved essentially as shown to fit over the rim 2a of a standard milk bottle 3.

Extending as a segment around the lower portion of the plate 1 I provide a further lower resilient clamp 4 similar in design, but somewhat wider than the aforementioned clamp 2. The clamp 4 is integrally formed with the shorter upstanding leg 5 of an L-shaped base 6. An inclined approach platform 7 overlies the longer leg of the base and engages the lower clamp 4. It will be observed that for simplicity of construction, the entire structure heretofore enumerated is formed integrally from one piece of material.

Positioned centrally in the plate 1 and immediately above the platform 7 there is provided an inlet aperture 8 into which is pressed a trap element 9. The latter consists of a wire mesh cylinder 10 open at the free end 11 thereof, and reinforced by a ring 12 at its other end whereby it is secured to the plate 1.

When the trap is placed in operation, banana peels, bread crumbs or similar bait may be placed in the bottle and it will be noted that the insects will be kept alive and may readily be removed by detaching the bottle from the associated trap. It should be noted that once the insect has entered the receptacle through the cylindrical trap element 9, the contour of slippery surface of the receptacle will prevent the insect from re-entering the cylindrical element 9.

In use of the invention, the longer leg of the base member 6 will rest upon a supporting structural element E and will lie in the same plane as an element of the surface of the receptacle or bottle 3 to prevent rolling of the receptacle upon the structural element E.

What I claim as my invention is:

1. An insect trap comprising a substantially horizontally disposed cylindrical receptacle having a reduced open end and a rim about its open end, a cover plate having an opening therein, a radially projecting resilient upper clamp extending from the cover plate and yieldingly gripping the rim, a radially projecting resilient lower clamp extending from the cover plate and resiliently gripping the rim, a substantially L-shaped base member having its shorter leg attached to said lower clamp, the longer leg of said L-shaped base member projecting outwardly from the open end of the receptacle, the longer leg of said L-shaped member being substantially horizontal and lying in the same plane as an element of the surface of the receptacle, a platform integrally formed with the longer leg of said L-shaped base member and inclining upwardly toward the opening in the cover plate, and an open ended wire mesh cylinder extending into the receptacle, said wire mesh cylinder having one end fitted in the opening in said cover plate.

2. An insect trap comprising a substantially horizontally disposed cylindrical receptacle having a reduced open end and a rim about its open end, a cover plate having a pair of diametrically opposed radially projecting upper and lower clamps yieldingly gripping the rim, a substantially L-shaped base member having its shorter leg integrally formed with the lower clamp, the longer leg of said L-shaped base member projecting outwardly from the open end of the receptacle, the longer leg of said L-shaped base member being substantially horizontal and lying in the same plane as an element of the surface of the receptacle, a platform integrally formed with the longer leg of said L-shaped base member and inclining upwardly toward the cover plate, said cover plate having an opening therein above the platform, and an open ended wire mesh cylinder extending into the receptacle, said wire mesh cylinder having one end fitted in the opening in said cover plate, said receptacle adapted to lie upon a supporting structural element and the longer leg of said L-shaped base member adapted to rest upon a supporting structural element to hold the receptacle against rolling.

CHARLES F. NELSON.

REFERENCES CITED

The following references are of record in the file of this patent:

UNITED STATES PATENTS

| Number | Name | Date |
|---|---|---|
| 455,096 | Cohen | June 30, 1891 |
| 598,521 | Karr | Feb. 8, 1898 |
| 1,085,329 | Gabel | Jan. 27, 1914 |
| 1,177,562 | Amato et al. | Mar. 28, 1916 |